(12) United States Patent
McGary et al.

(10) Patent No.: US 8,526,594 B2
(45) Date of Patent: *Sep. 3, 2013

(54) SYSTEM AND METHOD FOR IMPROVED DIRECTORY ASSISTANCE INCLUDING RE-DIAL FEATURE

(75) Inventors: Faith McGary, Bethlehem, PA (US); Xavier Riley, Center Valley, PA (US); Michael Bates, Worthington, OH (US); Scott DeNardo, Bethlehem, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,868

(22) Filed: Aug. 30, 2012

(65) Prior Publication Data

US 2012/0321065 A1 Dec. 20, 2012

Related U.S. Application Data

(63) Continuation of application No. 12/367,685, filed on Feb. 9, 2009, now Pat. No. 8,335,307.

(60) Provisional application No. 61/065,298, filed on Feb. 8, 2008.

(51) Int. Cl.
*H04M 3/42* (2006.01)

(52) U.S. Cl.
USPC .................................. 379/218.01; 379/213.01

(58) Field of Classification Search
USPC ....................................... 379/213.01, 218.01
See application file for complete search history.

(56) References Cited

U.S. PATENT DOCUMENTS

| | | | |
|---|---|---|---|
| 6,427,006 B1 | 7/2002 | Reding et al. |
| 2002/0055351 A1 | 5/2002 | Elsey et al. |
| 2007/0139990 A1 | 6/2007 | Kido et al. |
| 2007/0237318 A1 | 10/2007 | McGary |

OTHER PUBLICATIONS

Notification concerning transmittal of international preliminary report on patentability dated Aug. 10, 2010.
International Search Report dated Jun. 4, 2009.
Notification concerning international preliminary report on patentability dated Aug. 10, 2010.

*Primary Examiner* — Rasha Al Aubaidi
(74) *Attorney, Agent, or Firm* — Sofer & Haroun, LLP

(57) ABSTRACT

A directory assistance system includes a request handling module for receiving a plurality of incoming directory assistance requests from requesters and an agent platform for handling the directory assistance requests by providing at least one listing to the requester. A record database stores a record relating to the first request, and includes a first identifier, a time and a listing entry. An incoming request tracking module tracks second incoming directory assistance requests, by reviewing a second identifier associated with the directory assistance request, comparing the second identifier against the first identifiers in the records, and if a record has a matching first identifier to second identifier from request, then, prior to the second request being sent to the agent platform, offering to automatically provide the stored listing entry from the record to the requester.

13 Claims, 3 Drawing Sheets

| Record 30 | | |
|---|---|---|
| Identifier 32<br><br>xxx-xxx-xxxx | Time 34<br><br>00:00 AM/PM<br>XX/XX/XXXX | Listing 36<br><br>XYZ Restaurant<br>xxx-xxx-xxxx |

FIGURE 2

SYSTEM AND METHOD FOR IMPROVED DIRECTORY ASSISTANCE INCLUDING RE-DIAL FEATURE

RELATED APPLICATION

This application is a continuation of U.S. patent application Ser. No. 12/367,685, filed on Feb. 9, 2009, which in turn dams the benefit of priority from U.S. Provisional Patent Application No. 61/065,298, filed on Feb. 8, 2008, the entirety of which is incorporated by reference.

BACKGROUND

1. Field of the Invention

This application relates to directory assistance. More particularly, the application relates to call handling features for directory assistance.

2. Discussion of Prior Art

In directory assistance, such as telephonic directory assistance, a caller or requester contacts the system seeking contact information for a desired listing. The desired listing may be a particular listing or a generic request for any listing from a particular category (ie. hardware store, Chinese restaurant, etc. . . . )

During typical directory assistance call flows the user must be connected to an agent dive or automated) and go through a request process. The time used to handle the request is a significant factor in determining the overall call flow speed for a call center. Additionally, this time is usually considered by the caller/requester to be a nuisance for the longer the process, the lower the customer satisfaction.

SUMMARY

The present invention looks to overcome the drawbacks associated with the prior art, and to provide a system and method for improving directory assistance request handling speed for at least a portion of requests received by the system.

In one arrangement, the directory assistance system records a request and associated listing(s) provided in a request record which is associated with a particular requester. This record is stored for a predetermined time period. Thereafter, when the same requester contacts the directory assistance system within the given time frame, and they are identified by an identifier, their last directory request is immediately recalled and an automated response is provided to the requester inviting them to by-pass a normal directory query and proceed directly to re-connection with the prior listing.

BRIEF DESCRIPTION OF THE DRAWINGS

The present invention can be best understood through the following description and accompanying drawings, wherein:

FIG. 2 is an illustration of a request record, in accordance with one embodiment.

DETAILED DESCRIPTION

Figure 1:
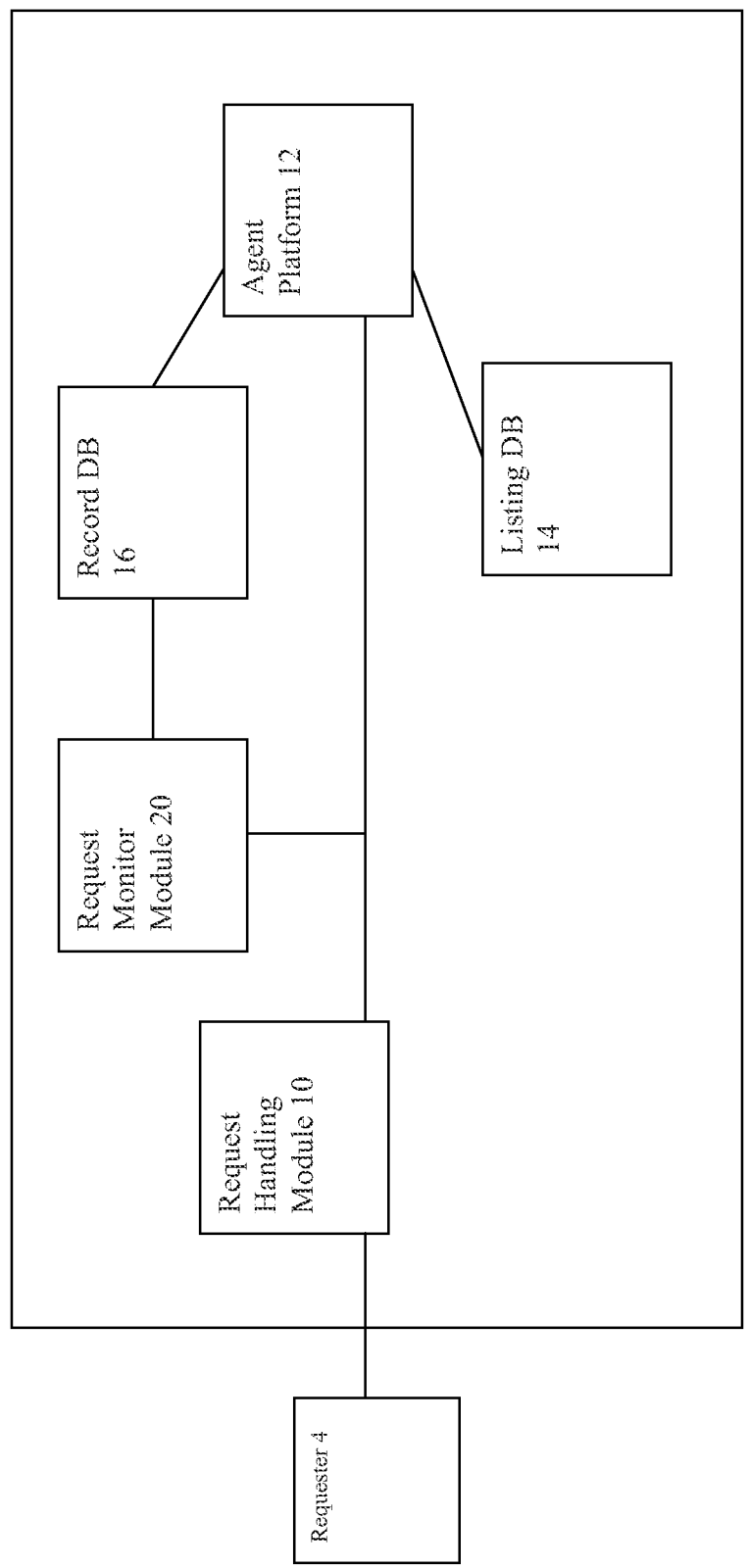
FIG. 1 shows a directory assistance system in accordance with one embodiment.

In one embodiment, as shown in FIG. 1, a directory assistance system 2 is shown. FIG. 1 shows an exemplary directory assistance handling center of the system 2. However, it is understood that many similar call centers may be geographically remote, but connected to one another forming system 2. For the purposes of illustration, all request handlings are shown with respect to one handling center of system 2, but it is understood that any action described herein may be made at any request handling center within system 2.

System 2, has a request handling module 10 configured to receive incoming requests to directory assistance system 2. In one typical arrangement, request handling module 10 is configured to be a typical telephone call handling equipment for handling incoming requests from requesters 4 initiated by telephone. Additionally, it is contemplated that request handling module 10 may be configured to handle any form of incoming communication including, but not limited to HTML, SMS, chat (IM) format, WAP, VoIP communications, etc. . . .

As shown in FIG. 1, system 2 includes an agent platform 12 which is either one of a live agent arrangement, an automated platform or a combination of the two. Agent platform 12 is configured to receive incoming requests, generated by requesters 4, from request handling module 10. A typical directory assistance request may be for a specific contact information such as the telephone number for XYZ restaurant, or it may be for a category type search, such as for "a hardware store."

Agent platform 12 reviews the request and attempts to serve the request by searching in listing database 14. As shown, listing database 14 is shown as a single database within system 2. However, it is understood that database 14 may be a combination of connected databases, being both proprietary or third party supported, which may be located within system 2 itself or remotely. Listing database 14 is configured to contain sufficient contact information allowing requester 4 to connect to the desired listing, including, but not limited to, telephone numbers, addresses, e-mail information, web addresses, etc. . . . After agent application reviews the request, one or more contact information(s) are provided to requester 4 in response as discussed in more detail below.

In one arrangement, as shown in FIG. 1, agent platform 12 is coupled to a second record database 16 which is used to track the history of requester 4 requests and the associated contact information provided.

For example, FIG. 2 shows an exemplary request record 30 associated with a particular requester 4. It is contemplated that when requester 4 contacts system 2 via request handling module 10, an requester identifier 32 is associated with the request. Identifier 32 is typically associated with a device of the requester such as the ANI (Automatic Number Identification), MIN (Mobile Identification Number), DID (Direct Inward Dialing), IP (Internet Protocol) address, etc. . . .

Record 30, stored in record database 16 also includes a time entry 34 associated with the time the request was handled (either start or completion time or both), as well as a listing provided entry 36. Listing provided entry 36 relates to the listing information that was provided to requester 4 in response to their query. Typically, each of the listings in listing database 14, in addition to the contact information, have some basic database record identifier associated therewith. It is contemplated that listing provided entry 36 in record 30 may store the contact information itself, the basic database record for that listing information or some combination of the two.

As shown in FIG. 1, system 2 further maintains incoming request tracking module 20 which is coupled to both request handling module 10 as well as to record database 16. Request tracking module is configured to review requester identifiers 32 from new requests entering system 2 from requesters 4 and to check to see if there are corresponding records 30 in record database 16 with the same request identifiers 32 from stored prior requests. If a record 30 is found with the same request identifier 32 as a new incoming request, tracking module may pull the record and offer reconnection to the listing in listing entry 36 of record 30 prior to the request being forwarded to agent platform 12 as described below.

Figure 3:
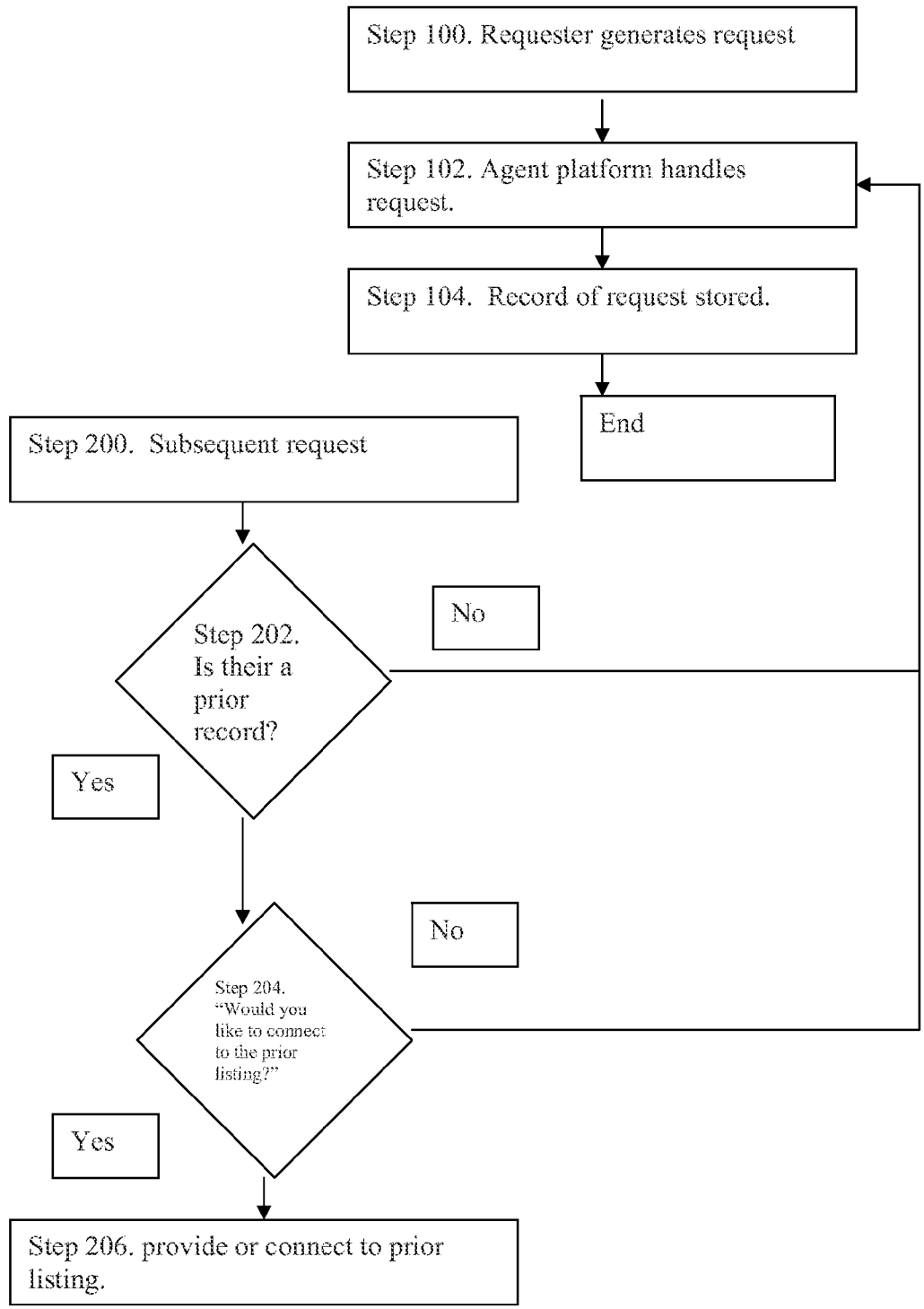
FIG. 3 is a flow diagram of a request, in accordance with one embodiment.

Turning to the operational flow of system 2, FIG. 3, shows the request flow for a typical request sent to system 2. At step 100, a requester 4 generates a request and delivers it to request handling module 10 of system 2. For the purposes of illustrating the salient features, this request is described in the form of a telephone call. However, as noted above, the request may be in one of many different electronic formats.

At step 102, agent platform 12 receives the request and searches for a desired listing or listing(s) in listing database 14. Once a listing is retrieved it is delivered to requester back via request handling module 10.

During and/or after this process, at step 104, agent platform 12 generates record 30 of the request, as described above, and stores it in record database 16 for a predetermined amount of time.

Next, it is assumed that the same requester 4 is contacting system 2 to make a subsequent request. At step 200, requester 4 contacts request handling module 10 of system 2. At step 202, prior to the request being forwarded to agent platform 12, incoming request tracking module 20 reviews the request, and particularly the identifier 32 associated with the request and compares it against records 30 stored in record database 16.

If there is no matching record, the request proceeds to agent platform 12 and is handled as per steps 102 and 104 described above. However, if a matching record is found, then at step 204, the requester 4 is immediately offered in, an automated manner, the ability to re-connect to the stored listing in listing entry 36 of record 30. If the user accepts then at step 206, request handling module 10 can either re-send the listing to requester 4 or re-connect them (call completion). It is contemplated that the manner for call handling may be set by stored requester preferences that are stored within system 2. If the user does not choose to re-connect to listing 36 in record 30, then again, the request is handled as per steps 102 and 104 above.

It has been found that on many occasions, requesters 4 that re-contact system 2 within a short period of time typically request the same listing as before. The above described arrangement, provides an automated system to immediately handle such reconnections without requester 4 even needing to indicate such a desire and likewise without in any way time burdening agent platform 12.

In one arrangement, records 30 in record database 16 are stored for 30 minutes (based on time entry 34 in record 30). This amount of time correlates to a typical amount of time requesters 4, that re-connect to system 2, desire to re-connect to the same listing 36.

In another arrangement, records 30 may be stored for different periods. In one example, records 30 may be stored for lesser time (eg. 15 minutes) or greater time (45 minutes) if it is found to produce more desirable results in the form of time saving on the agent platform 12 end versus the processing time for incoming request tracking module 20 to sift through records 30 in record database 16.

In another arrangement, records 30 may be stored for differing amounts of time, on an identifier-by-identifier basis. For example, system 2 may store records 30 for 45 minutes for requests that originated from mobile devices (as determined by device identifier 32), whereas calls from landline devices (as determined by device identifier 32) are only stored for 30 minutes. Also, if it is found that a particular requester 4 is requesting the same listing on a subsequent call/request about 1 hour after an initial request, records for that particular identifier 32 (associated with the particular requester 4) may be stored in record database 16 for an hour or an hour and fifteen minutes.

In another arrangement, in the case where requests from requester 4 are electronic, such as by SMS, and where system 2 switch time is less of a factor, it is possible that multiple records 30 within the predetermined time frame may be stored in record database 16. When SMS requester 4 re-connects to request handling module 10, incoming request tracking module 20 may push an SMS to requester 4 with two recent listings from record 30 prior to forwarding any requests onto agent platform 12.

Based on the above arrangement, directory assistance system 2 is able to reduce the number of incidences of requests being handled by the agent platform 12. At the same time, this arrangement also benefits requester 4 by pushing a listing to them immediately upon re-connection in instances where it is likely that they are desiring the same listing as before, obviating the need to even begin making an actual query.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A directory assistance system comprising:
a request handling module, for receiving a plurality of incoming directory assistance requests from requesters;
an agent platform for handling said directory assistance requests, where, in response to said directory assistance requests, at least one listing is provided to said requester;
a record database for storing a record relating to a first directory assistance request, said record including a first identifier, a time and a listing entry, wherein said record is stored for a predetermined amount of time based on either one of a request history of said requester associated with said record or a device type of said requester associated with said record; and
an incoming request tracking module configured to track a subsequent incoming directory assistance request,
wherein said incoming request tracking module reviews a second identifier associated with said subsequent directory assistance request, compares said second identifier against said first identifiers in said records stored in said record database, and if a record has a first identifier matching said second identifier from said subsequent incoming directory assistance request, then prior to said subsequent directory assistance request being sent to said agent platform, presenting directly to said requester an offering to automatically provide to said requester said stored listing entry from said record relating to the request made immediately preceding said subsequent request, and
if said offer is accepted by said requester, automatically connecting said requester to said at least one listing corresponding to a first directory assistance request, and
if said offer is declined by said requester, connecting said requester to said agent platform.

2. The system as claimed in claim 1, wherein said request handling module is configured to handle telephonic requests, and text based electronic requests.

3. The system as claimed in claim 1, wherein said agent platform is one of a live agent platform, an automated directory assistance platform, or a combination of the two.

4. The system as claimed in claim 1, wherein said first identifier is any one of a ANI, MIN, DID or IP ADDRESS.

5. The system as claimed in claim 1, wherein said record is stored in said record database for a first predetermined amount of time for mobile devices as known from said first identifier, and said record is stored in said record database for a second predetermined amount of time for fixed location devices as known from said first identifier.

6. The system as claimed in claim 1, wherein said incoming request tracking module is configured to re-connect said requester to said stored listing from said record.

7. A method for providing directory assistance comprising the steps of:
   receiving a plurality of incoming directory assistance requests from requesters at a request handling module;
   handling said directory assistance requests at an agent platform, wherein responses to said directory assistance requests include at least one listing is provided to said requester;
   storing a record relating to a first directory assistance request in a record database, said record including a first identifier, a time and a listing entry, wherein said record is stored for a predetermined amount of time based on either one of a request history of said requester associated with said record or a device type of said requester associated with said record; and
   tracking a subsequent incoming directory assistance request at an incoming request tracking module,
   wherein said incoming request tracking module reviews a second identifier associated with said subsequent directory assistance request, compares said second identifier against said first identifiers in said records stored in said record database, and if a record has a first identifier matching said second identifier from said subsequent incoming directory assistance request, then prior to said subsequent directory assistance request being sent to said agent platform, presenting directly to said requester an offering to automatically provide said stored listing entry from said record relating to the request made immediately preceding said subsequent request, and
   if said offer is accepted by said requester, automatically connecting said requester to said at least one listing corresponding to a first directory assistance request, and
   if said offer is declined by said requester, connecting said requester to said agent platform.

8. The method as claimed in claim 7, wherein said received request from said requesters are either telephone calls or text based electronic format.

9. The method as claimed in claim 7, where said directory assistance requests are handled by live agents, automated directory assistance or a combination of the two.

10. The method as claimed in claim 7, wherein said first identifier is any one of a ANI, MIN, DID or IP ADDRESS.

11. The method as claimed in claim 7, wherein said record is stored in said record database for a first predetermined amount of time for mobile devices as known from said first identifier, and said record is stored in said record database for a second predetermined amount of time for fixed location devices as known from said first identifier.

12. The method as claimed in claim 7, further comprising the step of re-connecting said requester to said stored listing from said record.

13. The method as claimed in claim 7, further comprising the step of sending two or more prior stored listing entries to said requester in text based electronic format.

* * * * *